Figure 1:
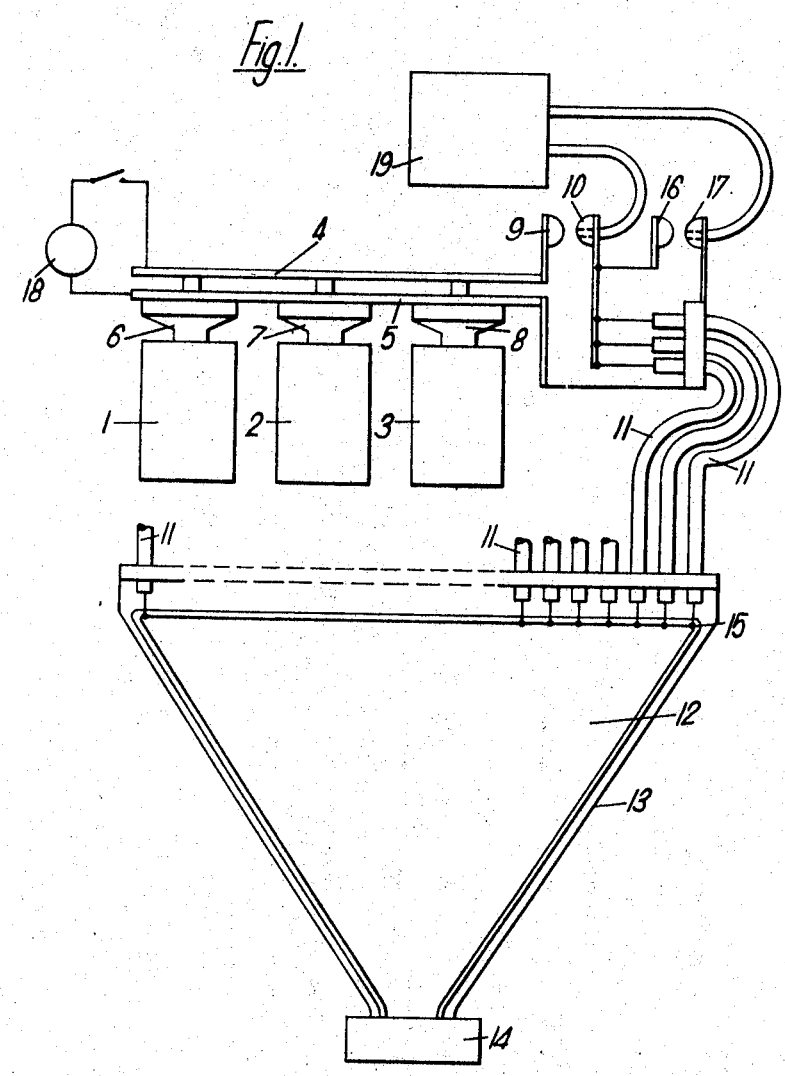

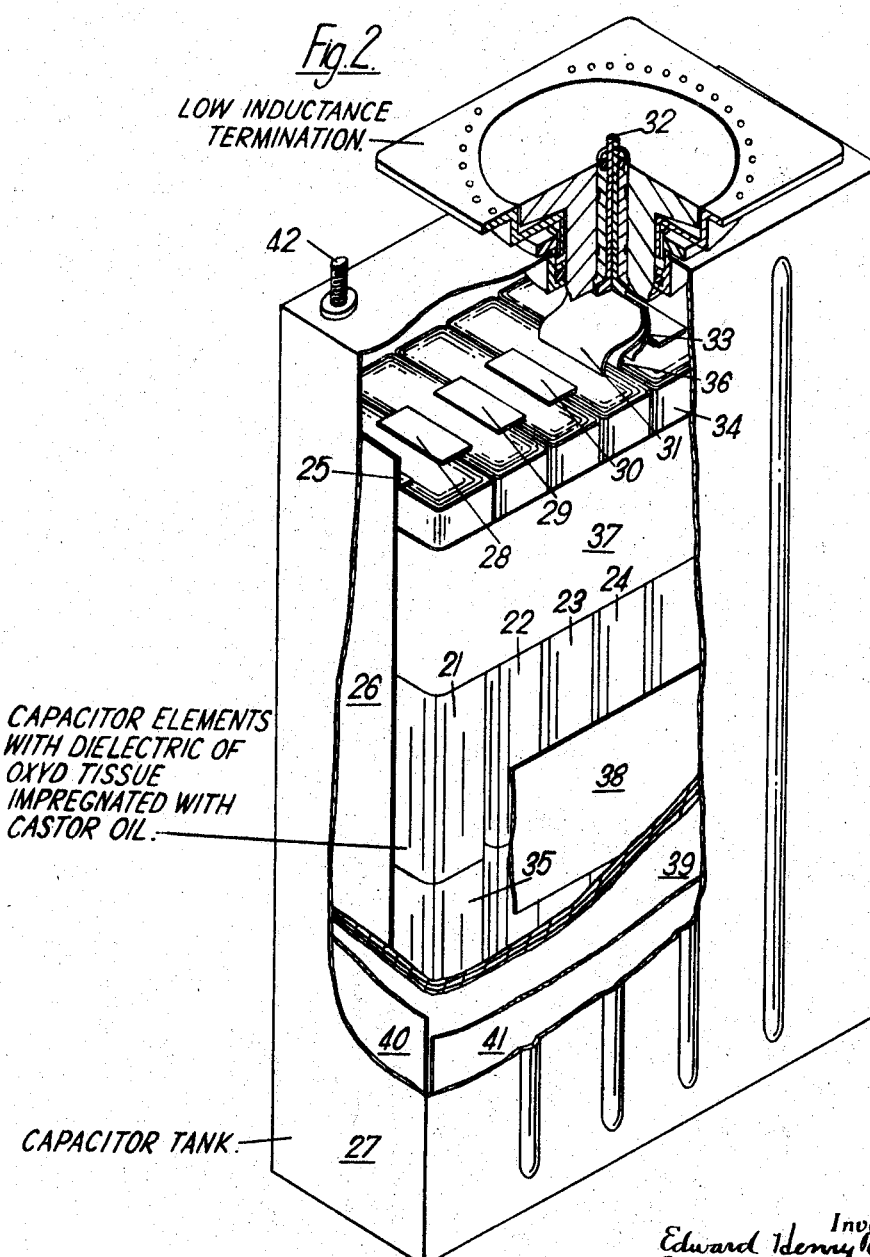

3,321,689
ELECTRIC CAPACITORS
Edward Henry Reynolds, London, and Gordon Alfred Curtis, Wallasey, England, assignors to British Insulated Callender's Cables Limited, London, England
Filed June 4, 1962, Ser. No. 199,985
Claims priority, application Great Britain, June 6, 1961, 20,388/61
8 Claims. (Cl. 320—1)

This invention relates to impregnated paper capacitors for energy storage and surge generators, that is to say to capacitors that are required to be alternately charged from a source of direct current supply to a peak voltage at which their dielectric is subjected to a high electrical stress, and rapidly discharged, and to dielectric for such capacitors. Frequently practical considerations justify or even necessitate stressing the dielectric of such capacitors so highly that under operating conditions ionisation occurs during each cycle of operations that results in slight damage to the dielectric. This damage is cumulative. Accordingly, the time taken for the dielectric to break down, that is to say, the working life of the capacitor, is a function of the damage per cycle sustained by the dielectric. The working life of such capacitors is, for a given dielectric, dependent upon the maximum stress to which the dielectric is subjected during each charging and discharging operation. It is an object of the invention to provide a capacitor having a life that can be reckoned in tens of thousands of cycles of operations.

The onerous practical conditions referred to above may for example make it necessary to provide a capacitor bank of 100 kilojoules or above, e.g. of one megajoule or even higher, capable of discharging through a circuit of substantially zero inductance to give an oscillatory discharge having a frequency of at least 50 kilocycles per second or even one megacycle per second. It has been found that in order to keep the inductance of the capacitor bank low enough to discharge at such frequencies the energy density of the capacitors in the bank must be 85 joules/litre or higher, preferably at least 100 joules/litre. In measuring energy densities for this purpose the volume of a capacitor is the volume of the container in which the capacitor element or elements are enclosed. To attain such high energy densities it is necessary to stress the dielectric of the capacitors at least 85 volts/micron and preferably to 100 volts/micron or more. It is difficult, if not impossible, to construct such a capacitor bank for use under the specified conditions from capacitors having conventional dielectric materials since such materials do not provide reliability and a reasonable life expectancy, coupled with the high energy densities required.

By the present invention we provide a novel and improved form of impregnated paper insulated capacitor for energy storage and surge generator purposes which has on the average a substantially longer life (expressed in total number of cycles to breakdown) than have energy storage and surge generator capacitors of known forms.

Our improved capacitor has a dielectric consisting of oxyd capacitor tissue, as hereinafter defined, impregnated with castor oil.

The invention also includes a heavy current pulse generator capable of operating under the conditions specifically referred to above and incorporating a bank of capacitors each having a dielectric of oxyd capacitor tissue impregnated with castor oil.

"Oxyd capacitor tissue" means capacitor tissue provided with finely divided active substances, such as metal hydroxides, hydrated metal oxides, or metal oxides, which present a large surface area and have predominantly colloidal particle sizes averaging 0.5 micron and less and which act upon the loss-causing impurities in the impregnant by binding them and then removing them from the impregnant when the previously heat and/or vacuum treated paper is impregnated, so as to reduce the energy loss in the dielectric. It is described and in its impregnated state is claimed in application Ser. No. 787,052, filed Jan. 15, 1959, and now U.S. Paent No. 3,090,705, assigned to Tervakoski Osakeyhtiö.

Castor oil is superior as an impregnant for energy storage and surge generator capacitors to the capacitor impregnants in common use, which are mineral oil and chlorinated diphenyls. This we believe to be due to three things: firstly, its greater tolerance for and absorption of water, secondly, its potentially superior compatibility with cellulose due to molecular similarity and better "wetting" properties, thirdly, its tendency under isonisation conditions to produce stable higher molecular weight products having good dielectric properties. Although this third characteristic is to some extent possessed by mineral oil, mineral oil/paper dielectrics have shorter lives than castor oil/paper dielectrics and mineral oil has a permittivity of only 2.1 to 2.2 as compared with 4.6 for castor oil. Chlorinated hydrocarbons have the advantage of higher permittivity but produce under ionisation conditions hydrochloric acid which is destructive of the dielectric.

Mineral oil impregnated oxyd tissue possesses a higher electrical breakdown strength than similar papers made from pulp beaten to the same degree and having the same density and air permeability characteristics and impregnated with mineral oil. For example, mineral oil impregnated kraft paper having a thickness of 25 microns and a density of 1.1 to 1.3 has an average breakdown strength of 2500 kv. per cm. The corresponding breakdown strength of oxyd tissue of approximately the same density is 2680 kv. per cm., an increase of 7.2%.

The combination of castor oil with oxyd tissue has been found to yield a synergistic effect as regards its use for energy storage and surge generator capacitors, in that castor oil impregnated oxyd capacitor tissue has been found to be much more satisfactory than would have been anticipated from a knowledge of the characteristic of each component. Castor oil impregnated oxyd capacitor tissue has in fact been found to be far superior to similarly impregnated capacitor tissue of substantially the same density made from ordinary kraft paper stock in that its life is about one and a half times that of the latter when each is used as dielectric in energy storage or surge generator capacitors and, moreover, the test results show greater uniformity, indicating greater reliability of the capacitor having a dielectric of castor oil impregnated oxyd tissue.

The surprisingly good results obtainable by use of capacitors having a dielectric of castor oil impregnated oxyd capacitor tissue for heavy current pulse generator purposes are indicated by the following test results taken on small capacitors made by winding aluminium electrodes separated by four layers of oxyd capacitor tissue of density 1.2 g./cc. and each 15 microns thick, the capacitance of each, after drying under vacuum for 195 hours at 95° C. to activate the oxide loaded tissue and impregnating with castor oil, being about 0.1 microfarad. Pulse life tests were carried out on five samples, the charging voltage being 5.54 kv., the Q of the discharge circuit (including the capacitors) being 5 and its resonant frequency being 200 kilocycles per second. The charge/discharge repetition period was 3.9 seconds. The following numbers of discharges were recorded before failure occurred:

| Sample: | Number of discharges before failure |
|---|---|
| 1 | 137,479 |
| 2 | 156,698 |
| 3 | 156,743 |
| 4 | 159,197 |
| 5 | 159,880 |

Test taken under virtually identical conditions on six samples each of:

(a) Kraft paper of the same thickness and density made from pulp of the same quality and impregnated with castor oil,
(b) Kraft paper of the same thickness and density and impregnated with mineral oil, and
(c) The same oxyd tissue impregnated with mineral oil, gave the following results:

| Sample | 1 | 2 | 3 | 4 | 5 | 6 |
|---|---|---|---|---|---|---|
| Number of discharges before failure: | | | | | | |
| (a) | 46,572 | 50,704 | 101,420 | 118,955 | 127,131 | 138,822 |
| (b) | 10,208 | 16,009 | 16,057 | 16,194 | 17,956 | 26,723 |
| (c) | 15,452 | 17,050 | 17,322 | 18,643 | 18,845 | 18,997 |

From these results it will be seen that the mean life of the kraft paper impregnated with castor oil was $0.96 \times 10^5$ whereas that of the oxyd tissue impregnated with castor oil was $1.54 \times 10^5$, an improvement of over one and a half times. It will be seen that the standard deviation for the castor oil impregnated oxyd tissue was only $\pm 0.08 \times 10^5$ whereas that for the castor oil impregnated kraft paper was $\pm 0.35 \times 10^5$, showing the much greater reliability of the castor oil impregnated oxyd tissue.

By making the two comparisons:

(1) Mineral oil impregnated kraft paper against mineral oil impregnated oxyd tissue and
(2) Castor oil impregnated kraft paper against castor oil impregnated oxyd tissue it will be seen that a much greater improvement is obtained when the impregnant is castor oil than would be expected from the results obtained when the impregnant is mineral oil, this being in accordance with the synergistic effect referred to above.

A one megajoule, 25 kv. heavy current pulse generator in accordance with the invention will hereinafter be described by way of example with reference to the accompanying drawings in which FIGURE 1 is a diagrammatic representation of the generator and FIGURE 2 is an isometric view, partly broken away, of one of the capacitors used in the generator. The general layout of the generator will first be described with reference to FIGURE 1.

The generator comprises a bank of 375 capacitors connected in parallel to a load circuit that is substantially a short circuit. Each capacitor (of which three only are shown) has a tank (1, 2, 3) of dimensions 56 cm. x 34 cm. x 12.5 cm. in which are immersed metal foil/paper roll elements in each of which the foils are separated by four oxyd tissues, each of thickness 15 microns. The elements are interconnected in the tank to give the capacitor a capacitance of 8.5 microfarads and a storage capacity of 2660 joules when charged at 25 kv. This entails stressing the dielectric at over 100 volts/micron. The elements are impregnated with and immersed in castor oil.

The capacitors are interconnected in groups of two or three by laminar bus bars 4 and 5 and disc shaped bushings 6, 7 and 8 of the kind described in application Ser. No. 111,677, filed May 22, 1961, and now U.S. Patent No. 3,122,606.

These bushings comprise a body of insulating material having a disc shaped head and a relatively thin neck which passes into the capacitor tank. The head is supported in a dish shaped metal casing with a tubular extension surrounding the neck and secured to the tank. The bus bar 5 is bolted to flanges on the dish shaped casings and the bus bar 4 is connected to conductors passing centrally through the heads and necks and through large apertures in the bus bar 5 into the tanks. The bus bar are spaced apart by thin layers of insulating material (not shown).

Each group of capacitors is connected through a triggered spark gap switch 9, 10 to three or four low inductance co-axial cables 11 providing parallel connections between the switches and a two part connector 12, 13 for the load circuit 14. All of the cables 11 (for all groups of capacitors) are of matched lengths and are connected in parallel to the load circuit 14 by the connector 12, 13. The conducting plates 12, 13 of the connector are separated by a dielectric sheet 15.

We prefer to provide each switch 9, 10 with an auxiliary clamping switch 16, 17, that is a further triggered spark gap switch connected across each group of co-axial cables 11 adjacent the main spark gap switch 9, 10 and timed to short circuit the capacitor group at its terminals when the discharge pulse first reaches its maximum current value.

The surge generator is provided with conventional connections to a 25 kv. source of charging current 18 and electronic means 19 for triggering the spark gap switches.

We have found that with an arrangement of this kind it is possible to produce heavy current pulses that reach their peak voltage in less than 50 microseconds and that the life of the generator, when operated in this way, is of the order mentioned above.

Referring to FIGURE 2 of the drawings, each capacitor comprises sixteen wound elements arranged in four groups of four, the upper left hand group of four elements can be clearly seen in the drawing and these four elements have been given the references 21, 22, 23 and 24. Each element is wound from two metal foils interleaved with two sets of four tapes of oxyd capacitor tissue each of thickness 15 microns (to give a dielectric thickness of 60 microns) and is provided with two terminal tags.

The left hand tag 25 of element 21 is connected to a vertical bus strip 26 which is itself connected to the metal tank 27 of the capacitor. Adjacent tags of the elements are interconnected at 28, 29 and 30 and the right hand tag 31 of element 24 is connected to a centre pin 32 of a terminal bushing for the capacitor. The upper right hand four elements are similarly interconnected and the left hand tag 33 of the left hand element 34 is also connected to the terminal pin 32.

The remaining eight elements, of which the extreme left hand element is given the reference 35, are mounted with their terminals downwards and interconnected in a similar way. The adjacent terminal tags of the inner elements of the two lower groups (equivalent to elements 24 and 34 of the upper groups) are interconnected and also connected by a bus strip 36, which passes upwards between elements 24 and 34, to the terminal pin 32. The outer terminals of the outer elements are connected to the tank 27 via the outer bus strips, such as 26.

The elements are held together by retaining bands 37, 38, given an overall wrapping 39, and insulated from the tank 27 by insulating plates 40 and 41.

The tank 27, which is provided with an earth stud 42, is filled with castor oil. As mentioned above the terminal bushing, having a centre pin 32, is a very low inductance bushing of a kind which is the subject of co-pending application Ser. No. 111,677, filed May 22, 1961, by Thomas W. Hunt and John E. Cox.

What we claim as our invention is:

1. An impregnated paper insulated capacitor for energy storage and surge generator purposes comprising at least two electrodes and a dielectric material separating said electrodes consisting of oxyd capacitor tissue impregnated with castor oil.

2. An impregnated paper insulated capacitor for energy storage and surge generator purposes comprising a plurality of capacitor elements, each comprising at least two metal foil electrodes and dielectric material separating said electrodes consisting of oxyd capacitor tissue impregnated with castor oil, a liquid tight container for said elements, sufficient castor oil in said container to immerse said elements, terminals passing through the container wall and electrical connections between the electrodes of said elements and said terminals.

3. A surge generator comprising a capacitor bank having a storage capacity of at least 100 kilojoules and an inductance such that it is capable of discharging on short circuit at least 50 kilocycles per second, comprising a plurality of capacitors each having an energy density of at least 85 joules/litre and comprising electrodes separated by a dielectric of oxyd tissue impregnated with castor oil, means for charging the capacitors to stress said dielectric to at least 85 volts/micron and means for rapidly discharging the capacitor bank through a load circuit.

4. A surge generator as claimed in claim 3 in which means is provided for charging the capacitors to stress the dielectric to at least 100 volts/micron.

5. A surge generator as claimed in claim 3 having a storage capacity of at least one megajoule built up from capacitors each having an energy density of at least 100 joules/litre.

6. A surge generator as claimed in claim 5 capable of discharging on short circuit at a frequency up to at least one megacycle per second.

7. A surge generator as claimed in claim 5 in which means is provided for charging the capacitors to stress the dielectric to at least 100 volts/micron.

8. A surge generator as claimed in claim 7 capable of discharging on short circuit at a frequency up to at least one megacycle per second.

References Cited by the Examiner

UNITED STATES PATENTS

| | | | |
|---|---|---|---|
| 2,266,810 | 12/1941 | Ruben | 317—258 X |
| 3,090,705 | 5/1963 | Miksits | 317—259 |

OTHER REFERENCES

Marbury: Power Capacitors, New York, McGraw-Hill, 1949, page 9.

BERNARD KONICK, *Primary Examiner.*

IRVING L. SRAGOW, JAMES W. MOFFITT, R. J. MCCLOSKEY, G. LIEBERSTEIN, *Assistant Examiners.*